United States Patent
Telgkamp et al.

(10) Patent No.: US 8,864,072 B2
(45) Date of Patent: Oct. 21, 2014

(54) STRUCTURAL COMPONENT WITH IMPROVED CONDUCTIVITY AND MECHANICAL STRENGTH, AND A METHOD FOR ITS MANUFACTURE

(75) Inventors: Jens Telgkamp, Buxtehude (DE); Wolfgang Schulze, Hasloh (DE); Thomas Kruse, Hermannsburg (DE)

(73) Assignee: Airbus Operations GmbH, Hamburg (DE)

( * ) Notice: Subject to any disclaimer, the term of this patent is extended or adjusted under 35 U.S.C. 154(b) by 118 days.

(21) Appl. No.: 13/105,959

(22) Filed: May 12, 2011

(65) Prior Publication Data

US 2011/0278395 A1   Nov. 17, 2011

Related U.S. Application Data

(60) Provisional application No. 61/333,771, filed on May 12, 2010, provisional application No. 61/406,632, filed on Oct. 26, 2010.

(30) Foreign Application Priority Data

May 12, 2010   (DE) .......................... 10 2010 020 369
Oct. 26, 2010   (DE) .......................... 10 2010 042 970

(51) Int. Cl.
*B64C 1/00*   (2006.01)
*B29C 70/88*   (2006.01)
*B64C 1/06*   (2006.01)
*B64D 45/02*   (2006.01)
*B29C 70/08*   (2006.01)

(52) U.S. Cl.
CPC .............. *B29C 70/885* (2013.01); *Y02T 50/433* (2013.01); *B64C 1/061* (2013.01); *B64C 2001/0072* (2013.01); *B64D 45/02* (2013.01); *B29C 70/088* (2013.01); *Y02T 50/43* (2013.01); *B64C 1/064* (2013.01)
USPC .......... 244/119; 244/121; 244/123.1; 244/133

(58) Field of Classification Search
USPC ........... 244/119, 121, 123.1, 132, 133, 129.7, 244/171.7
See application file for complete search history.

(56) References Cited

U.S. PATENT DOCUMENTS

| 5,951,800 | A | * | 9/1999 | Pettit | 156/157 |
| 7,628,879 | B2 | * | 12/2009 | Ackerman | 156/98 |
| 2008/0251636 | A1 | | 10/2008 | Soula | |
| 2009/0258220 | A1 | | 10/2009 | Schaaf | |
| 2010/0025533 | A1 | * | 2/2010 | Bimanand et al. | 244/121 |
| 2010/0206989 | A1 | | 8/2010 | Roming | |

(Continued)

FOREIGN PATENT DOCUMENTS

DE   102006024604 A1   11/2007
DE   102007029337 A1   6/2009

(Continued)

*Primary Examiner* — Timothy D Collins
*Assistant Examiner* — Jamie S Stehle
(74) *Attorney, Agent, or Firm* — Leydig, Voit & Mayer, Ltd.

(57) ABSTRACT

A structural component includes a fiber composite material structure having an outer surface and an electrically conductive metal profile disposed on the outer surface of the fiber composite material structure. The metal profile provides provide improved electrical conductivity of the structural component and component protection.

13 Claims, 3 Drawing Sheets

(56) References Cited

U.S. PATENT DOCUMENTS

| | | |
|---|---|---|
| 2011/0011980 A1 | 1/2011 | Tacke |
| 2011/0014356 A1* | 1/2011 | Fornes et al. .................. 427/58 |
| 2011/0095130 A1 | 4/2011 | Luettig |
| 2011/0133031 A1* | 6/2011 | Shah et al. .................. 244/119 |
| 2011/0147045 A1* | 6/2011 | Bluvband et al. .......... 174/126.1 |

FOREIGN PATENT DOCUMENTS

| | | |
|---|---|---|
| DE | 102008006834 A1 | 10/2009 |
| DE | 102007056164 A1 | 12/2009 |
| DE | 102008002117 A1 | 12/2009 |
| DE | 102008044229 A1 | 6/2010 |
| WO | WO 2009128991 A1 | 10/2009 |

* cited by examiner

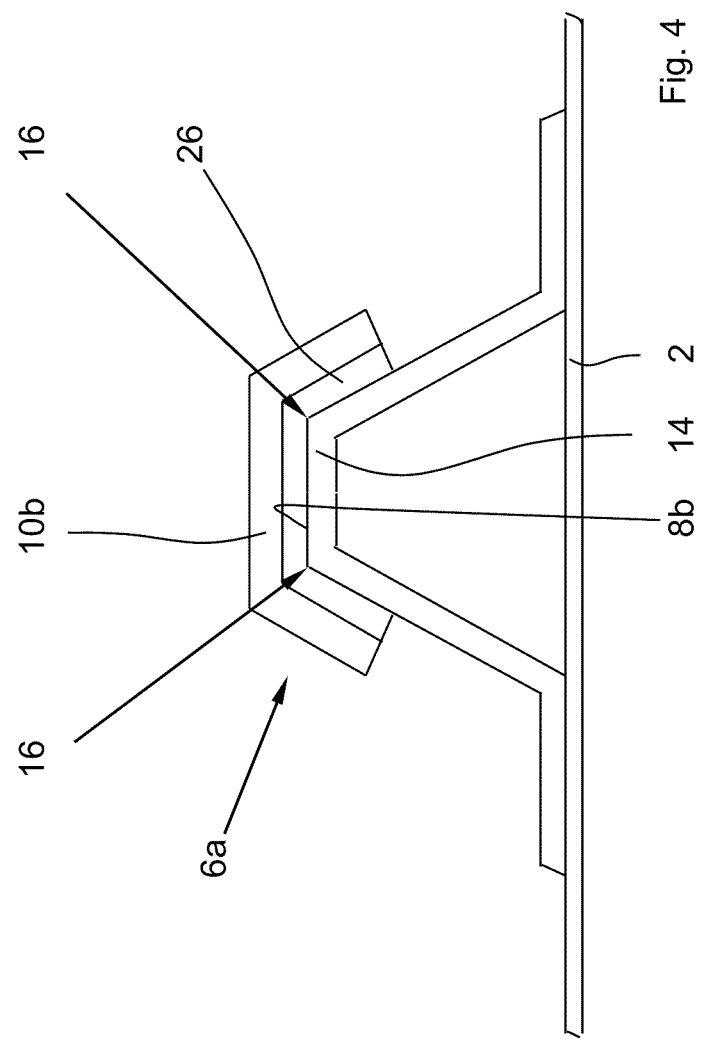

STRUCTURAL COMPONENT WITH IMPROVED CONDUCTIVITY AND MECHANICAL STRENGTH, AND A METHOD FOR ITS MANUFACTURE

CROSS REFERENCE TO RELATED APPLICATIONS

This application claims priority to German Patent Application No. DE 10 2010 020 369.6, filed May 12, 2010, U.S. Provisional Patent Application No. 61/333,771, filed May 12, 2010, German Patent Application No. DE 10 2010 042 970.8, filed Oct. 26, 2010, and U.S. Provisional Patent Application No. 61/406,632, filed Oct. 26, 2010, all of which are incorporated by reference herein in their entireties.

FIELD

The invention concerns a structural component of a fiber composite material with an electrically conductive metal profile and a method for manufacturing the component.

BACKGROUND

In today's aircraft many of the structural components used are of fiber composite materials, for example, of carbon fiber composite materials (CFRP). In such materials the electrical conductivity compared with metallic structures is more weakly defined and the quality of an electrical connection based solely on the electrical conductivity of the individual carbon fibers cannot be predicted reliably. For this reason electrical functions, such as, in particular, protection from lightning strike, return paths for currents of electrical loads, provision of a stable electrical earth, and the screening of systems and cable looms from electromagnetic radiation are not undertaken, or are not undertaken to a sufficient extent, by the primary structure.

WO 2009/128991 A1 shows that the lightning protection function can be achieved via a metallic film or a metallic network inlaid into the main panels. Further electrical functions (return paths for currents, stable electrical earth, etc.) are often ensured by a system of additional metallic elements, a so-called electrical structural network (ESN system). The ESN system uses a combination of various metallic structural elements, such as, for example, the metallic seat rails, and profiles arranged in the region of the fuselage structure.

What is disadvantageous in such systems is the fact that the additional metallic components significantly encumber the installation of structures and systems and increase the structural weight. Furthermore the industrial concept, by virtue of the large number of individual parts and the sequence of assembly that must be maintained, is complex in terms of production technology; this has a negative effect on both the production costs, and also on the time required in particular stages of production. Also disadvantageous is the fact that the fiber composite components can be structurally damaged by mechanical effects, for example, by the impact of tools during production. A delamination caused in this manner is difficult to detect visually, but can significantly reduce the mechanical load that can be applied to the component. As a result the component must be dimensioned such that if damage is present that is difficult to detect the end result cannot be failure of the component. Overall such structures are complex in terms of both production and assembly technology, cost intensive, and do not utilize the full potential of the fiber composite mode of construction.

SUMMARY

An aspect of the invention is to provide a structural component of a fiber composite material, and to create a method for its manufacture, in which the mechanical and electrical functions are enabled with minimal effort in terms of production and assembly technology.

In an embodiment, the present invention provides a structural component including a fiber composite material structure having an outer surface and an electrically conductive metal profile disposed on the outer surface of the fiber composite material structure. The metal profile provides provide improved electrical conductivity of the structural component and component protection.

BRIEF DESCRIPTION OF THE DRAWINGS

Exemplary embodiments of the present invention are described in more detail below with reference to the schematic representations shown in the drawings, in which:

FIG. 4 shows a sectional representation of an embodiment of a structural component designed as a stringer.

DETAILED DESCRIPTION

Figure 1:
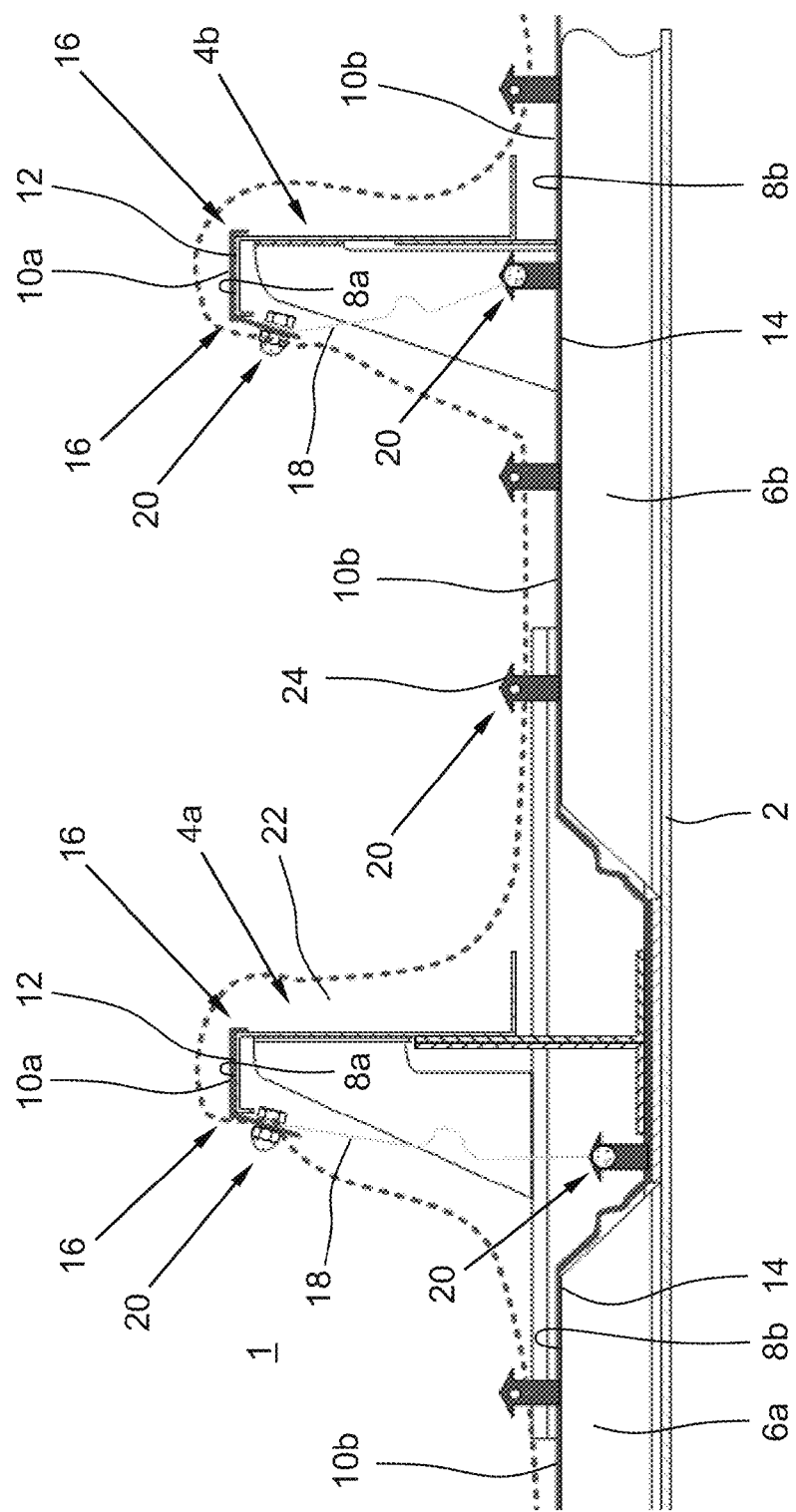
FIG. 1 shows a sectional representation of an aeroplane fuselage in the region of an outer skin, including an embodiment of the invention.

In accordance with an embodiment of the invention, a structural component, in particular for an aircraft structure, is produced at least in some sections from a fiber composite material that is provided with at least one electrically conductive metal profile for establishing or improving the electrical conductivity of the component. The metal profile is arranged on an outer surface of the structural component and in addition to the electrical conductivity provides component protection. The component provided with a metal profile thereby fulfils, in addition to the electrical function, a structural mechanics function in which the fiber composite structure is protected from mechanical effects. In particular a homogeneous introduction of force is achieved by means of the metal profile in the case of an impact event, for example, an impact of a tool onto the structure, wherein the consequences of the impact for the primary structure of fiber composite materials are averted or at least greatly reduced by the local plasticity of the metal profile and an elastic redistribution of the load (providing a more even distribution over the surface of the composite structure component, thereby avoiding local stress peaks in the composite structure). By this means the structures in accordance with the invention are advantageous in terms of production and assembly technology and enable a weight reduction by virtue of the integral form of construction.

In accordance with a particularly preferred embodiment of the invention the metal profile is designed as a metal strip that is arranged directly and in a planar manner on the outer surface of the structural component. The dimensions of the metal strip are hereby selected such that in addition to the electrical conductivity sufficient component protection is provided.

In another embodiment the metal profile is indirectly arranged on the structural component via at least one electrically insulating compensation layer, which has a lower modulus of elasticity than the metal profile. The compensation layer is, for example, a rubber layer and inter alia deforms elastically in the event of impact loadings. By this means a further reduction of impact energy is achieved and the structural section in question is not loaded, or is even less loaded, even in the event of severe impacts. As a result it is only necessary to provide evidence of electrical functionality concerning the impact hazard, while any consequence for the certification of the primary structure is avoided. Moreover, by virtue of the elastic deformability of the compensation layer there is a mechanical decoupling of the metal profile in the event of loads acting on the structural component. Moreover, by virtue of the low modulus of elasticity of the compensation layer any mechanical stresses that can arise as a result of the differing thermal expansions of the fiber-reinforced composite material and the metal profile are evened out. In the two last cited advantages the compensation layer provides at least an evening out of local peak expansions or peak stresses. Furthermore, an electrical insulation is achieved relative to the fiber-reinforced concert material to make possible an earth return path and formation of a reference voltage. In addition, the fiber-reinforced composite structure is thermally insulated relative to the metal profile; the latter can, for example, heat up significantly in the presence of stray leakage currents, and can thus degenerate the fiber-reinforced composite material.

The structural component can advantageously be designed as a frame or stringer of an aeroplane fuselage structure. By this means these components, in addition to their roles as stiffeners, can be used in accordance with the invention for purposes of electrical conduction, wherein the metal profiles that are applied to externally accessible locations that are at risk also serve to provide component protection.

In one particularly preferred embodiment the metal profile is arranged on an inner flange of the frame and/or on an inner web of the stringer, so that these regions, which are subject to loads in the case of an impact event, are protected.

Preferably the metal profile encompasses, at least in some sections, the inner flange of the frame and/or the inner web of the stringer in edge regions. By this means the structure is also protected by means of the metal strip from impact events in the edge region.

It has been shown to be particularly advantageous if the metal profile of the stringer is connected by means of a connecting element, for example, a cable, with the metal profile of the frame in an electrically conductive manner, such that a network arrangement is formed. The metal strips of the stringers together with the metal strips of the frames hereby form a network, which preferably covers the fuselage completely. The mesh size of this network is defined by the frame spacings in the longitudinal direction (of the order of 400-600 mm), and also the stringer spacings in the circumferential direction (of the order of 150-250 mm). Such an arrangement leads to the screening of external electromagnetic radiation in certain frequency ranges. By means of this additional screening the cable looms within the fuselage structure are subjected to less electromagnetic radiation from external sources. By this means the local screening of the cable looms, for example by means of a metallic screen directly on the cable loom, can either be configured in a less complex manner, or no longer be necessary. From this additional cost and weight advantages ensue.

In addition to the advantages cited with regard to weight, production costs and production time, a further advantage ensues with regard to the architecture of the electrical systems. The metallic lattice formed from metal strips at preferably all stringer and frame positions offers the possibility of providing attachment points for the return paths of electrical currents and/or as an earthing reference for electrical systems. The arrangement of these points can follow a regular pattern in the longitudinal and circumferential directions, such that the architecture of electrical systems is simplified, and in each case only a relatively short cable to the nearest attachment point is required.

In this solution it has been shown to be particularly advantageous if the metal profiles have connecting points for the electrical connecting element for purposes of earthing connections, and for insulating elements, in particular insulating mats. The metal strips are arranged outboard of the barrier formed by the insulating mats, while the electrical connections are for the most part to be carried out inboard of the thermal/acoustic insulating mats, since the cabin installation lies inboard of the insulating mats. In the present invention this problem is preferably solved in that the insulating mats are held with metallic attachment strips, which are bent forwards from the metal strips. These function at the same time both as holders for the insulating mats and as electrical terminals, wherein the attachment can be made at the tip of the attachment strip, that is to say, inboard of the insulating mat. In one embodiment the metal profiles are designed in the form of strips, wherein the connecting points are formed by punching out and bending up profile regions in some sections. Alternatively or additionally prefabricated connecting profiles can be attached onto the metal profiles, for example by means of a point welding method. The connecting profiles are preferably provided with a penetration point, which has at least one detent projection for purposes of fixing the insulating elements.

A method in accordance with an embodiment of the invention for the manufacture of a structural component of a fiber composite material, in particular for an aircraft structure, comprises the forming of a structural component from a fiber composite materials and the application of a metal profile onto an outer surface of the structural component, which in addition to the electrical conductivity provides component protection.

In one embodiment the application of the metal profile takes place before the curing of the fiber composite material structure. Here the metal profile is applied to the structural component before the curing of the latter, and is cured with the latter. By this means a high strength integral component is achieved with a defined electrical conductivity and protection against impact events.

In an alternative embodiment the metal profile is bonded to the fiber composite material structure after the curing of the latter.

Both variants share the advantage that the integration of the metal profiles can take place in the earlier stage of component production, and not during structural assembly. This reduces the labour involved in assembly, and leads to a reduction of the production costs.

In one embodiment at least one electrically insulating compensation layer is arranged between the metal profile and the fiber-reinforced composite material or outer surface, which compensation layer has a lower modulus of elasticity than the metal profile.

For purposes of achieving an attachment of the metal profile to the compensation layer that can absorb loads, the insulating compensation layer is cured with the fiber reinforced composite material structure, and the metal profile is then subsequently vulcanized onto the insulation layer.

Figure 2:
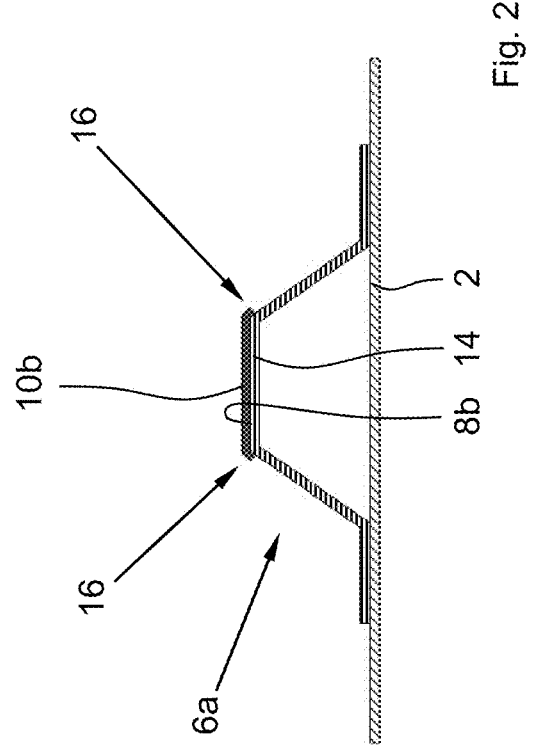
FIG. 2 shows a sectional representation of a structural component designed as a stringer from FIG. 1.

FIG. 1 shows a sectional representation of an aeroplane fuselage structure 1 in the region of an outer skin 2, which is provided with a first embodiment of structural components 4, 6 in accordance with the invention. In the embodiment of the invention represented the structural components are designed as frames 4a, b and stringers 6a, b of the aeroplane fuselage structure 1. The frames 4a, b and stringers 6a, b are produced from a fiber composite material and are provided on an outer surface 8 with metal profiles 10a, b in the form of strips, which in addition to improving the electrical conductivity provide component protection. The metal profiles 10a are arranged on an inner flange 12 of the frames 4 and on an inner web 14 of the stringers 6 designed as omega profiles as in FIG. 2. The application of the metal profiles 10a, b can take place before the curing of the fiber composite material structure. Here the metal profiles 10a, b are applied to the structural component before the curing of the latter, and are cured with the latter. By this means a high strength integral component is achieved with a defined electrical conductivity and protection against impact events. In one alternative embodiment the metal profile 10a, b is bonded to the fiber composite material structure after the curing of the latter. The metal profiles 10a, b lead to a homogeneous introduction of force in the case of an impact event, for example, an impact of a tool onto the structure, wherein the consequences of the impact for the primary structure of fiber composite materials are averted or at least greatly reduced by the local plasticity of the metal profile 10a, b and an elastic redistribution of the stresses (providing a more even distribution over the surface of the composite structure component). The metal profiles 10a, b encompass in some sections the inner flange 12 of the frame 4a, b and/or the inner web 14 of the stringer 6a, b in edge regions 16, as a result of which the structure is also protected from impact events in the edge region. However, encompassing of the edge regions 16 by the metal profile 10a, b is not absolutely essential, but simply represents one variant.

The metal strips 10b of the stringers 6a, b together with the metal strips 10a of the frames 4b form a network, which preferably covers the fuselage completely. The mesh size of this network is defined by the frame spacings in the longitudinal direction and the stringer spacings in the circumferential direction. By means of cables 18 provided as connecting elements the metal profiles 10b of the stringers 6 are connected with the metal profiles 10a of the frames 4 in an electrically conductive manner, such that the network arrangement is formed. The metallic lattice formed from the metal strips 10a, b at preferably all stringer and frame positions hereby offers the possibility of providing regular attachment points for the return paths of electrical currents and/or as an earthing reference for electrical systems. The arrangement of these points can follow a regular pattern in the longitudinal and circumferential directions, such that the architecture of electrical systems is simplified, and in each case only a relatively short cable to the nearest attachment point is required. Such an arrangement leads furthermore to the screening of external electromagnetic radiation in certain frequency ranges. By means of this additional screening the cable looms within the pressurized fuselage are subjected to less electromagnetic radiation from external sources. By this means the local screening of the cable looms, for example by means of a metallic screen directly on the cable loom, can either be configured in a less complex manner, or no longer be necessary. From this, additional cost and weight advantages ensue.

Figure 3:
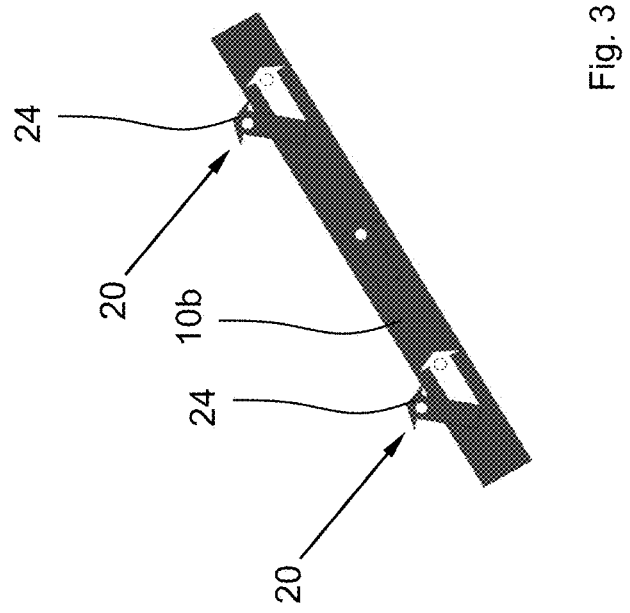
FIG. 3 shows a detailed representation of a metal profile from FIG. 1.

As can in particular be seen from FIG. 3, which shows a detailed representation of a metal profile from FIG. 1, the metal profiles 10a, b are designed as approximately rectangular metal strips, which are integrally arranged directly and in a planar manner on the outer surface 8a, b of the structural component. The dimensions of the metal strips 10a, b are hereby selected such that in addition to the electrical conductivity sufficient component protection is achieved. As can be seen in particular from FIG. 1, the metal strips 10a, b are provided with connecting points 20 for the connecting cables 18 and the attachment of the electrical connection, for example for earthing purposes, or for the current return paths for the cabin systems. For purposes of attachment a screw or a contact element fixed in the attachment hole can be used. The connecting points 20 serve furthermore for the attachment of insulating mats 22. Here the metal strips 10a, b are arranged outboard of the barrier formed by the insulating mats 22, while the electrical connections for the most part are to be made inboard of the thermal/acoustic insulating mats 22, since the cabin installation lies inboard of the insulating mats 22. In accordance with embodiments of the present invention this problem is solved in that the insulating mats 22 are held with metallic attachment strips as connecting points 20, which are bent forwards from the metal strips 10a, b. The connecting points 20 are in each case provided with a triangular penetration point 24, which has a detent projection for purposes of fixing the insulating mats 22. The connecting points 20 serve at the same time as holders for the insulating mats 22 and as electrical connections, wherein the connection can take place at the tip of the connecting point. The connecting points 20 are formed by punching out and bending up profile regions in some sections. Alternatively or additionally prefabricated connecting profiles can be attached onto the metal strips 10a, b, for example by means of a point welding method.

FIG. 4 shows another embodiment in accordance with the invention. In this embodiment an electrically insulating compensation layer 26 is in each case arranged as an intermediate layer between the outer surface 8 of the fiber composite material and the metal profiles 10a, b, which compensation layer has a lower modulus of elasticity than the metal profile. Thus the metal profiles 10a, b are not directly attached to the outer surface 8, as in the preceding embodiment, but indirectly.

The compensation layer 26 is configured in the form of a plate and is arranged over the full surface between the outer surface 8 and the metal profile 10a, b. In a manner corresponding to the metal profiles 10a, b it encompasses in some sections the inner flange 12 of the fiber-reinforced composite material or frame 4a, b, and/or the inner web 14 of the stringer 6a, b in the edge regions 16. In the case in which, for example, the metal profile 10a, b is designed as a planar metal strip, however, the compensation layer 26 can also be arranged only on the inner flange 12 and/or on the inner web 14 without encompassing the edge regions 16. It has in each case a low modulus of elasticity such that it has elastic, i.e. rubber-type, properties. The compensation layer 26 effects a further improvement of the reduction of the impact energy, a mechanical decoupling of the metal profile 10a, b in the event of loads acting on the fiber-reinforced composite material, electrical insulation of the metal profiles 10a, b relative to the fiber-reinforced composite material, thermal insulation of the metal profiles 10a, b relative to the fiber-reinforced composite material, and an evening out of mechanical stresses that arise as a result of different thermal expansion coefficients, including an evening out of local peak expansions occurring as a result of structural loading and/or thermal expansion stresses.

The compensation layer 26 is preferably cured integrally with the fiber-reinforced composite material. After the curing the metal profiles 10a, b are then attached to the compensation layer 26, for example, by means of vulcanization, i.e. vulcanization onto the compensation layer.

Disclosed is a structural component of a fiber-reinforced composite material, in particular for an aircraft structure, with at least one electrically conducting metal profile for the manufacture or improvement of the electrical conductivity of the component, wherein the metal profile is arranged indirectly or directly on an outer surface of the structural component and in addition to the electrical conductivity provides component protection, for example, such that it is only necessary to provide evidence of electrical functionality concerning the impact hazard, while any consequence for the certification of the primary structure is avoided. Also disclosed is a method for the manufacture of such a structural component.

While the invention has been particularly shown and described with reference to preferred embodiments thereof, it will be understood by those skilled in the art that various changes in form and details may be made therein without departing from the spirit and scope of the invention.

REFERENCE SYMBOL LIST
- 1 Aeroplane fuselage structure
- 2 Outer skin
- 4 Frame
- 6 Stringer
- 8 Outer surface
- 10 Metal profile
- 12 Inner flange
- 14 Inner web
- 16 Edge region
- 18 Cable
- 20 Connecting point
- 22 Insulating mat
- 24 Penetration point
- 26 Insulating compensation layer

What is claimed is:

1. A structural component of an aircraft fuselage structure, the structural component comprising:
   a fiber composite material structure designed as at least one of a frame or stringer comprising a web portion extending upwards relative to a skin of the aircraft, the fiber composite material structure being arranged on the skin of the aircraft fuselage and having an outer surface; and
   at least one electrically conductive metal profile attached to the outer surface of the fiber composite material structure so as to provide improved electrical conductivity of the structural component and component protection.

2. The structural component recited in claim 1, wherein the metal profile includes a metal strip and is disposed directly and in a planar manner on the fiber composite material structure.

3. The structural component recited in claim 1, further comprising at least one electrically insulating compensation layer having a lower modulus of elasticity than the at least one metal profile, the at least one electrically insulating compensation layer being disposed between the at least one metal profile and the outer surface.

4. The structural component recited in claim 1, wherein the at least one metal profile is bonded to the fiber composite material structure after manufacture of the fiber composite material structure.

5. The structural component recited in claim 1, wherein the at least one metal profile is cured with the fiber composite material structure.

6. The structural component recited in claim 4, wherein the structural component includes the frame and the at least one metal profile is disposed on an inner flange of the frame.

7. The structural component recited in claim 6, wherein the at least one metal profile encompasses at least a portion of an edge region of the-inner flange of the frame.

8. The structural component recited in claim 1, wherein the structural component includes the frame and the stringer, each of the frame and the stringer including a corresponding metal profile of the at least one metal profile, and
   wherein the metal profile of the stringer is electrically conductively connected to the metal profile of the frame with a connecting element so as to form a network arrangement.

9. The structural component recited in claim 8, wherein the connecting element is a cable.

10. The structural component recited in claim 8, wherein each of the metal profile of the stringer and the metal profile of the frame includes a connecting point configured for at least one of a corresponding connecting element and for an insulating element.

11. The structural component recited in claim 10, wherein the insulating element is an insulating mat.

12. The structural component recited in claim 4, wherein the structural component includes the stringer and the at least one metal profile is disposed on an inner web of the stringer.

13. The structural component recited in claim 12, wherein the at least one metal profile encompasses at least a portion of an edge region of the inner web of the stringer.

* * * * *